United States Patent
Chu et al.

(10) Patent No.: US 7,106,008 B2
(45) Date of Patent: Sep. 12, 2006

(54) FLASHLIGHT CONTROL CIRCUIT (75) Inventors: Yu-Shan Chu, Hsinchu (TW); Ming-Nan Chuang, Hsinchu (TW)

(73) Assignee: Leadtread Technology Corp., Hsinchu (TW)

( * ) Notice: Subject to any disclaimer, the term of this patent is extended or adjusted under 35 U.S.C. 154(b) by 43 days.

(21) Appl. No.: 10/930,996

(22) Filed: Aug. 31, 2004

(65) Prior Publication Data

US 2005/0231129 A1    Oct. 20, 2005

(30) Foreign Application Priority Data

Apr. 16, 2004    (TW) ............................... 93110696 A (51) Int. Cl.
  *H05B 41/14*    (2006.01)
(52) U.S. Cl. ...................... 315/241; 315/107
(58) Field of Classification Search ................ 315/241, 315/107, 101, 130; 396/157, 234; 362/113
See application file for complete search history.

(56) References Cited

U.S. PATENT DOCUMENTS 4,623,929 A * 11/1986 Johnson et al. .......... 315/241 S
5,159,381 A * 10/1992 Harrison ..................... 396/156
6,349,175 B1 * 2/2002 Tokunaga ................... 396/157
6,359,651 B1   3/2002 Yokonuma .................. 315/241
6,441,856 B1   8/2002 Sugimoto ................... 315/241

FOREIGN PATENT DOCUMENTS

TW    562986    11/2003
TW    570206     1/2004

* cited by examiner

*Primary Examiner*—Tuyet Vo
*Assistant Examiner*—Jimmy Vu
(74) *Attorney, Agent, or Firm*—Birch, Stewart, Kolasch & Birch, LLP (57) ABSTRACT

A flashlight control circuit is provided to control the flash according to an exposure voltage and a predetermined voltage. Either a first comparator, second comparator and logic gate or a comparator, a first inverter, a first transistor, a first logic gate and a second logic gate may be included in the control circuit. The provided circuit enables the capacitor to discharge promptly when the trigger signal stops. Therefore, an additional control signal for discharge is not necessary. Furthermore, the circuit has a clamping circuit to clamp the exposure voltage at a lower level than the predetermined voltage according to a full flash signal.

10 Claims, 5 Drawing Sheets

FLASHLIGHT CONTROL CIRCUIT

This application claims the benefit of Taiwan Patent Application No. 93110696, filed on Apr. 16, 2004, which is hereby incorporated by reference for all purposes as if fully set forth herein.

BACKGROUND OF THE INVENTION

1. Field of Invention

The invention pertains to a camera flash control circuit and particularly to a flash control circuit with reduced luminance error of a generated flash by use of a phototransistor.

2. Related Art

With the progress digital image processing technology and charge coupling devices (CCDs), digital cameras have become very important. Since computers have become widely used and other kinds of digital technology are improving rapidly, the digital camera has found itself many more applications. With these advantageous contributions, our daily life is pushed rapidly to become more digitized.

The flash is an indispensable part of a camera. Current flash light operation has a preflash stage and a main flash stage. The former is performed for determining the luminance of an object to be photographed. Next, the determined luminance is used to determine a required luminance of the flash in the main flash stage. Specifically, the time for the preflash is considerably short, e.g. 3 μs. Then, a CCD and a central processing unit (CPU) in the camera are used to compute the required luminance of the flash and the corresponding time for the main flash stage, which is typically 0.1 ms to 3 ms. As such, the flash may be controlled to match the required amount of the exposure in any environment.

For example, U.S. Pat. Nos. 6,441,856, and 6,359,651 and Taiwan patent No. 570206 adopt the two-stage flash technology. However, since the flash is generated by discharge of a large capacitor charged with a high voltage, such as 160 uF/330V, the preflash stage may reduce the maximum energy which may be released at the main flash stage.

Taiwan patent 562986 also disclosed an apparatus and a method for controlling a flash, in which no preflash stage is needed. In the apparatus, a light-adjustment circuit is used to perform an opto-electrical transformation for the reflected light from an object to be photographed, i.e., incident light emitted from the flash, to output an exposure voltage. When the flash voltage is greater than the reference voltage, the flash ceases to emit a light, which means that the luminance of the flash is sufficient. On the other hand, when the exposure voltage is lower than the reference voltage, the flash keeps emitting light.

Although the technology in this patent may improve the disadvantages in the prior art, it still has some technical problems that need to be improved. For example, the flash requires an additional discharge signal, and lacks the function of forcing flash generation. In addition, the control circuit is composed of bi-polar junction transistors, which leads to a slower response speed, a larger transmission delay and has an inclination to over-exposure and imprecise flash control.

Furthermore, too much error may occur in current technology. In a luminance test of a single camera after multiple preflashes, the luminance falls between 130 and 160 and thus has an error of about 10%. Therefore, the technology using preflash to determine the required exposure is not precise enough.

A precise flash control may not be necessary for previous digital cameras with fewer pixels. However, this is not the case for currently used cameras with more pixels, in which the flash control has a considerable effect on the resulting image quality. For precise flash control, many factors must be considered such as number of components, operating range of the voltage and signal delay. Therefore, developing a more precise flash control technology using fewer components has become an urgent need in the technology field.

SUMMARY OF THE INVENTION

In view of the foregoing problems in the prior art, the invention provides a flash control circuit to substantially solve the drawbacks and problems in the prior art.

According to the invention, the flash control circuit controls the luminance of a flash according to an exposure voltage and a predetermined voltage, wherein the exposure voltage is produced by charging a capacitor with an inducted current produced by a phototransistor.

According to an embodiment of the invention, a trigger circuit of the flash control circuit comprises a first comparator receiving an exposure voltage and a predetermined voltage. It compares the exposure voltage and the predetermined voltage to output a first comparison signal. The trigger circuit also comprises a second comparator receiving a trigger signal and a reference voltage. It compares the trigger signal and the reference voltage to output a first comparison signal and a logic gate having two inputs coupled to an output of the first comparator and an output of the second comparator respectively to compare the first comparison signal and the second comparison signal. It then outputs a flash trigger signal to trigger the flash to give off a flash when the first comparison signal and the second comparison signal are both at a low voltage level.

According to the invention, the flash control circuit further comprises a second transistor having a gate terminal coupled to a positive input of the second comparator, a source terminal coupled to ground and a drain terminal receiving an exposure voltage so as to form a discharge path when the trigger signal stops. In addition, a clamping circuit is included for clamping the voltage level of the exposure voltage to be lower than that of the predetermined voltage according to a full flash signal to force flash generation.

According to the invention, another embodiment of the trigger circuit of the flash control circuit comprises a comparator receiving an exposure voltage and a predetermined voltage to output a first comparison signal; a first inverter receiving a trigger signal and inverting the trigger signal; a first transistor having a gate terminal coupled to an output of the first transistor; a drain terminal coupled to a negative input of the comparator and a source terminal coupled to the ground and forming a discharge path when the trigger signal stops; a first logic gate receiving a first comparison signal, a trigger signal and an output signal of a second logic gate to output a flash trigger signal; a second logic gate receiving an invert trigger signal and a flash trigger signal and outputting to the first logic gate; a second inverter coupled to an output of the first logic gate to invert the flash trigger signal.

According to the invention, the flash control circuit further comprises a clamping circuit to clamp the exposure voltage at a lower level than the predetermined voltage according to a full flash signal.

According to the principles and objects of the invention, the advantages and the technical effects are listed as follows.

According to the principles and objects of the invention, the flash control circuit has the advantages of reduced control signals and reduced control pins.

According to the principles and objects of the invention, the flash control circuit has the advantage of not needing an additional discharge signal.

According to the principles and objects of the invention, the flash control circuit only needs a lower reference voltage.

According to the principles and objects of the invention, the flash control circuit has a larger operating range of the reference voltage.

According to the principles and objects of the invention, the reference voltage of the flash control circuit may be directly adjusted by a digital to analog converter (DAC) without needing an additional circuit.

According to the principles and objects of the invention, the flash control circuit has a control signal to support a function of a full flash to force flash generation.

According to the principles and objects of the invention, the flash control circuit has the advantages of better precision and lower transmission delay.

According to the principles and objects of the invention, the flash control circuit has the advantage of reduced error in luminance of the flash after multiple luminance tests.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to an embodiment of the present invention, example of which is illustrated in the accompanying drawings.

Figure 1:
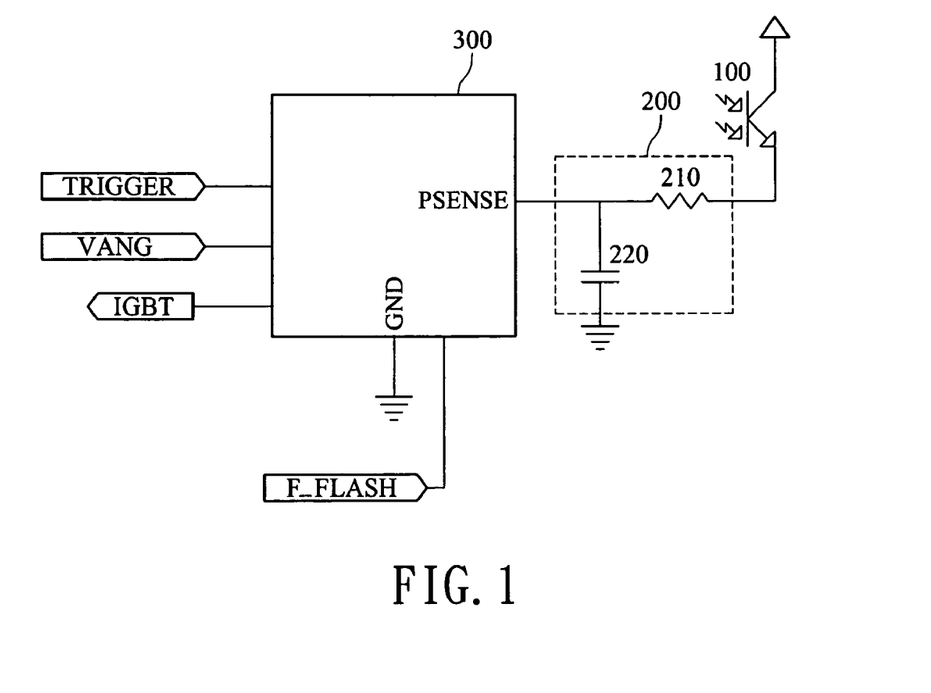
FIG. 1 is a circuit block diagram of a flash control circuit according to the invention.

FIG. 1 illustrates the architecture of a flash control circuit according to the invention. Since the phototransistor has the characteristics of light sensitivity and fast response and the collector current is linear with the input light, it s employed to sense the intensity of a reflected light from an object to be photographed.

As illustrated in FIG. 1, the flash control circuit comprises a phototransistor 100, a luminance sense circuit 200 and a trigger circuit 300. The luminance sense circuit 200 comprises a resistor 210 and a capacitor 220. The trigger circuit 300 is mainly composed of metal oxide semiconductor field effect transistors (MOSFETs) and has a first terminal TRIGGER receiving a trigger signal, a second terminal VANG adjusting a predetermined voltage, a third end PSENSE receiving an exposure voltage, a fourth terminal IGBT outputting a flash trigger signal, a fifth terminal F_FLASH controlling flash generation and a ground GND.

Figure 2:
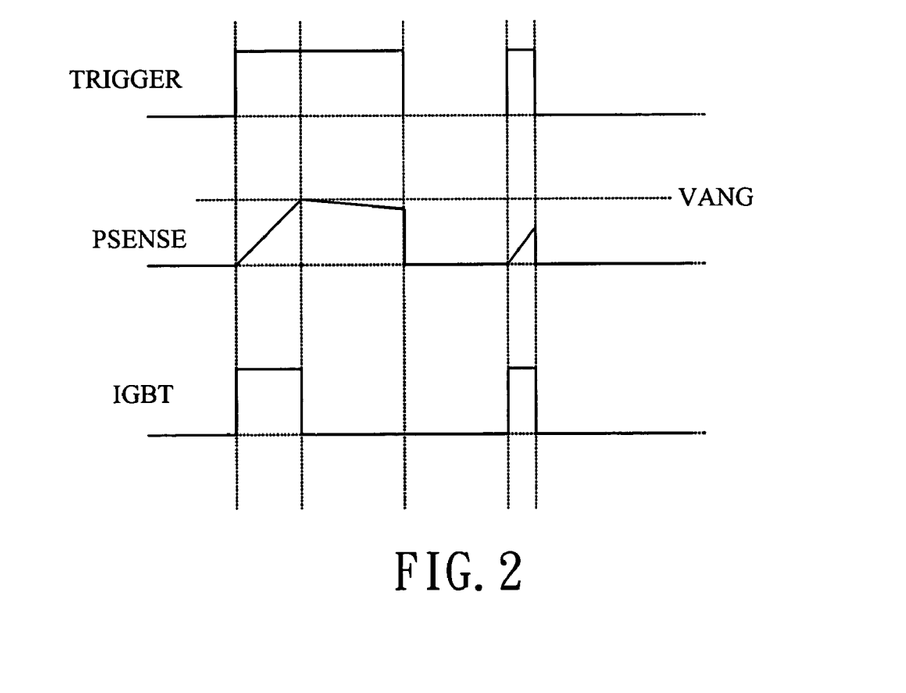
FIG. 2 is a timing diagram of the flash control circuit according to the invention.

FIG. 2 is a timing diagram of the flash control circuit according to the invention. With reference to FIG. 2, an isolated gate terminal bi-polar transistor (IGBT) may be switched to an on state to cause a flash to be emitted when a trigger signal from a fourth terminal IGBT is at a high level.

At that time, the phototransistor 100 senses a flash and then charges the capacitor 220 like a current source terminal to about 0.5 mA to 1 mA. When the capacitor 220 is charged to a predetermined voltage, i.e., VANG in FIG. 2, and the fourth terminal IGBT has a low-level output, the IGBT is cut off and stops the flash.

Since the capacitor 220 has been charged to a predetermined voltage, the phototransistor 100 no longer charges the capacitor 220. At that time, the trigger circuit 300 outputs a latch signal to latch the IGBT at the current state so as to prevent the capacitor 220 from falling below the predetermined voltage due to current leakage, and prevent the trigger circuit 300 from misjudging and thus mis-triggering a flash. When the trigger signal is at a low level, the capacitor 220 rapidly discharges completely and then waits for the next trigger signal.

Referring again to FIG. 2, when the trigger signal is at a high level, the capacitor 220 is charged due to the high-level trigger signal, and the fourth terminal IGBT also has a high-level output signal. However, if the trigger signal has too short a trigger time, the capacitor 220 is not charged, i.e., the trigger circuit 300 may cut off the terminal IGBT.

According to the invention, the predetermined voltage may be adjusted through the second terminal VANG by a DAC or directly by a direct-current voltage, and the adjustment ranges from about 50 mV to the bias Vcc.

According to the invention, different machines will be subject to calibration before actual use, which is initiated through the second terminal VANG of the circuit 300 and triggered by errors detected in the circuit components. For a calibrated single camera, each component in the trigger circuit 300 may be considered fixed. For a single camera, its luminance error may be reduced after multiple luminance tests.

The trigger circuit 300 includes a fifth terminal F_FLASH which may control flash generation. When a flash is needed, the third terminal PSENSE receiving the luminance sense voltage is clamped below the predetermined voltage in order to achieve that purpose.

Figure 3:
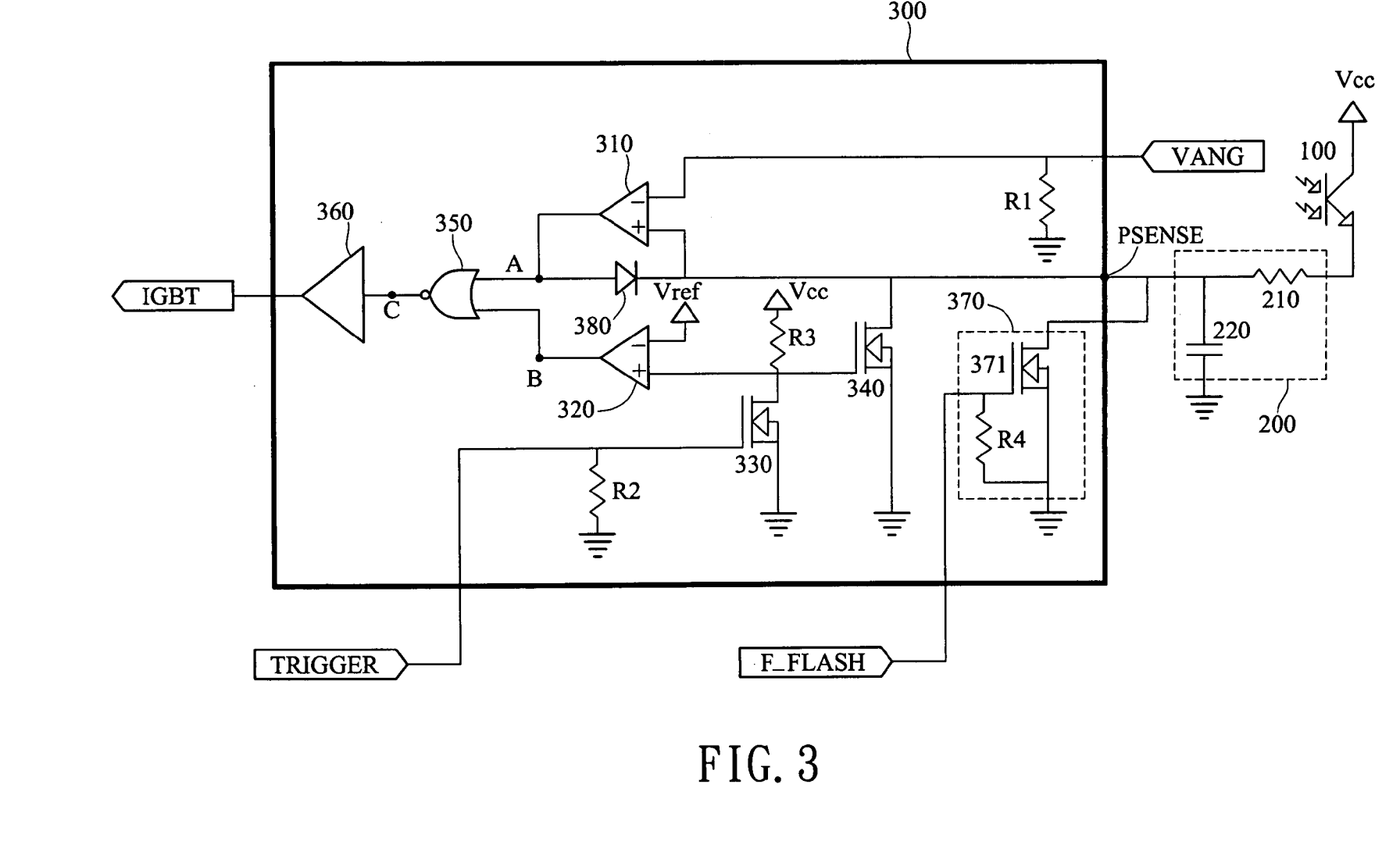
FIG. 3 illustrates a first embodiment of the flash control circuit according to the invention.

A first embodiment of the trigger circuit 300 according to the invention will be described with reference to FIG. 3 in composition and FIG. 4 in timing. The embodiment of the trigger circuit 300 comprises a first comparator 310, a second comparator 320 and a logic gate 350. The first comparator 310 is used to receive and compare a luminance sense voltage and a predetermined voltage to output a first comparison signal. The second comparator 320 is used to receive and compare a trigger signal and a reference voltage Vref (divided from Vcc) to output a second comparison signal. The logic gate 350 has two input terminals coupled to an output of the first comparator 310 and an output of the second comparator 320 respectively. When the first and second comparison signals are both at a low level, the logic gate 350 outputs a high-level flash trigger signal to trigger flash emission. The embodiment further comprises a first resistor R1 coupled between the negative input of the first comparator 310 and the ground to avoid formation of high resistance when the signal VANG is not connected and the voltage becomes undefined.

The embodiment further comprises a first transistor 330, which is an NMOS transistor, used to receive a trigger signal to make the second comparator 320 to issue a low-level second comparison signal. The embodiment further comprises a second resistor R2 coupled between the gate terminal of the first transistor 330 and the ground to avoid formation of high resistance when the trigger signal is not connected and the voltage becomes undefined.

A third resistor R3 is coupled between the drain terminal of the first transistor 330 and a bias Vcc to promote the voltage level.

The trigger circuit 300 further comprises a second transistor 340, which is an NMOS transistor, having the gate terminal of the transistor 340 coupled to a positive input terminal of the second comparator 320, a source terminal coupled to the ground and a drain terminal receiving the luminance sense voltage to form a discharge path when the trigger signal stops. In addition, the embodiment comprises a clamping circuit 370 consisting of a third transistor 371 and a fourth resistor R4, used to clamp the luminance voltage to below the predetermined voltage and force generation of a flash according to a full flash signal.

The operation of the first embodiment according to the invention is described specifically as follows. As illustrated in the drawing, the predetermined voltage set by the second terminal VANG is inputted to the negative input terminal of the first comparator 310, and the positive input terminal of the first comparator 310 is inputted with the sense signal received by the third terminal PSENSE. A reference voltage is input into the negative input terminal of the second comparator 320 and a signal at the drain terminal of the transistor 330 is input into the positive input terminal of the second comparator 320.

A trigger signal received by the first terminal TRIGGER controls the gate terminal of the first transistor 330. When the trigger signal is at a low level, the first transistor 330 is not turned on while the second transistor 340 is turned on. At that time, the voltage charged in the capacitor 220 discharges to the ground and is thus zero through the second NMOS transistor 340. That is, when the trigger signal is at a low level, the capacitor 220 may discharge promptly without needing an additional discharge control signal.

Figure 4:
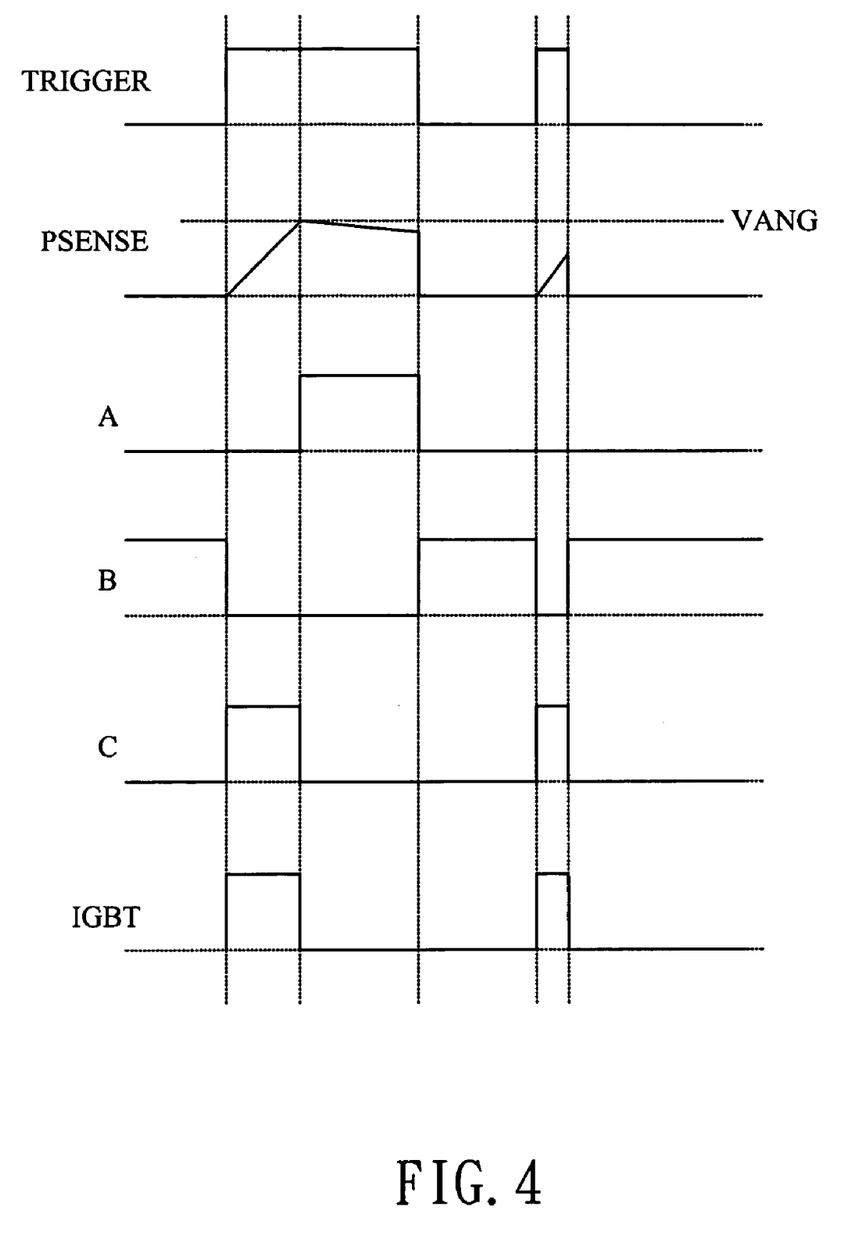
FIG. 4 illustrates a timing diagram of the first embodiment of the flash control circuit according to the invention.

FIG. 4 shows that terminal A is an output of the first comparator 310, terminal B is an output of the second comparator 320 and terminal C is an output of the logic gate 350. When the trigger signal is at a high level, the capacitor 220 is charged because the phototransistor 100 is turned on. Since the charge voltage is less than the predetermined voltage during the charging period, the first comparator 110 outputs a low-level signal. The high-level trigger signal enables the first transistor 330 to be on while the second transistor 340 is not on, so the second comparator 320 also outputs a low-level signal. Since the logic gate 340 is a NOR gate, the logic gate 350 outputs a high-level signal. Next, the outputted high-level signal triggers the flash trigger circuit when driven by a driver 360 to enable a flash.

When the trigger signal is at a high level, the capacitor 220 continues to be charged and the terminals A and B are kept at a low level. When the capacitor 220 is charged to a predetermined voltage, the signal on the terminal A is at a high level while the signal on the terminal B is at a low level. With the function of the logic gate 350, terminal C outputs a high-level signal during the charging period and a low-level signal when the capacitor 220 is charged to the predetermined voltage. Therefore, the output voltage of the logic gate 350 determines if the flash is triggered.

When the capacitor 220 is charged to the predetermined voltage, a diode 380 connected between the output and the positive input of the first comparator 310 turns on and thus latches the output of the logic gate 350 so as to avoid leakage of the capacitor 220 and mis-triggering.

However, when the trigger signal is at a high level but lasts for too short a time, causing the capacitor to not be charged to the predetermined voltage, the trigger module 300 automatically cuts off capacitor charging.

When forcing a flash, a clamping circuit 370 comprising a third transistor 371 and a fourth resistor R4 may be added to clamp the luminance voltage sensed by the third terminal PSENSE to below the predetermined voltage. At that time, the comparator determines that the capacitor 220 is not charged to the predetermined voltage and continues to trigger the flash.

Figure 5:
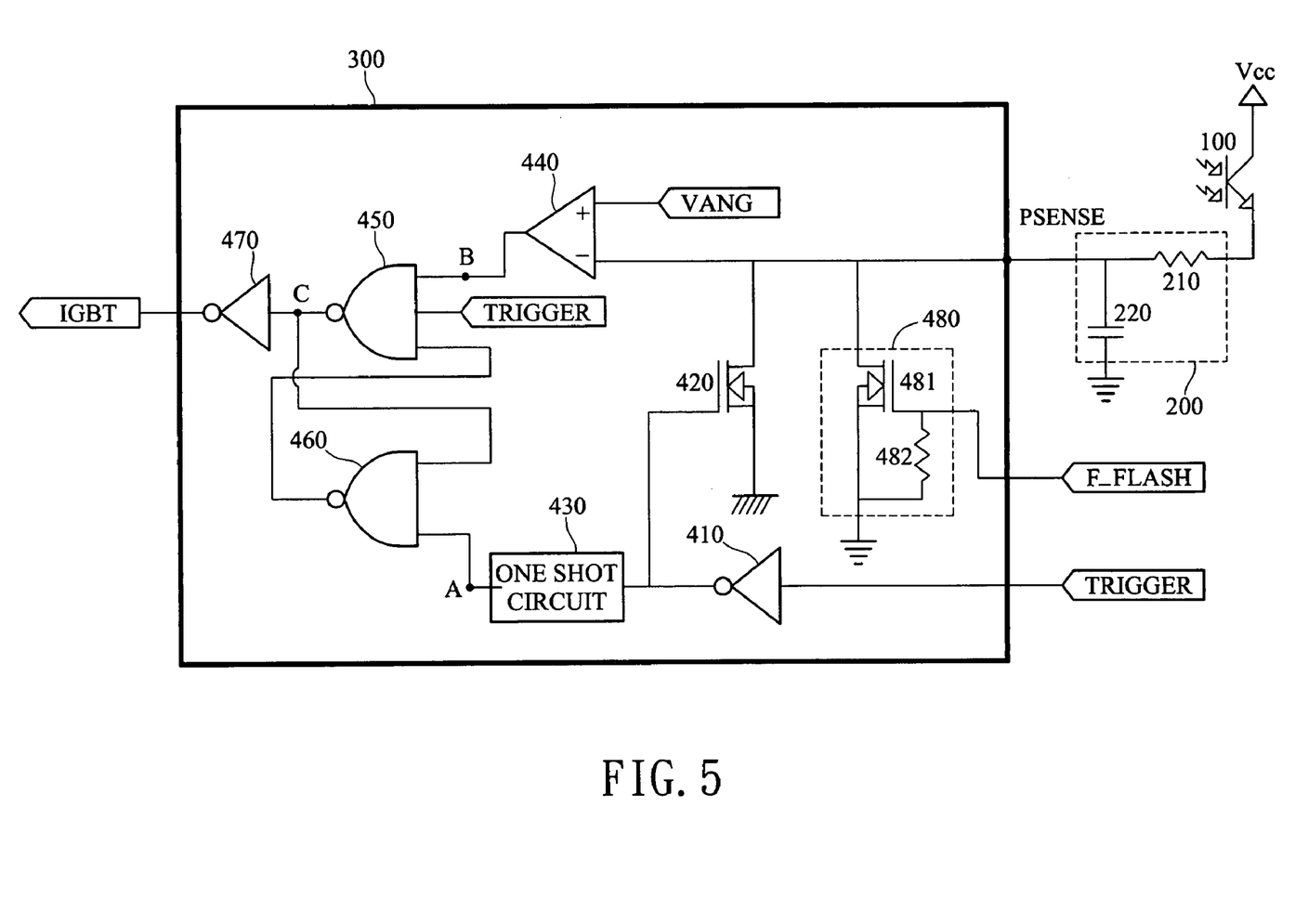
FIG. 5 illustrates a second embodiment of the flash control circuit according to the invention.
Figure 6:
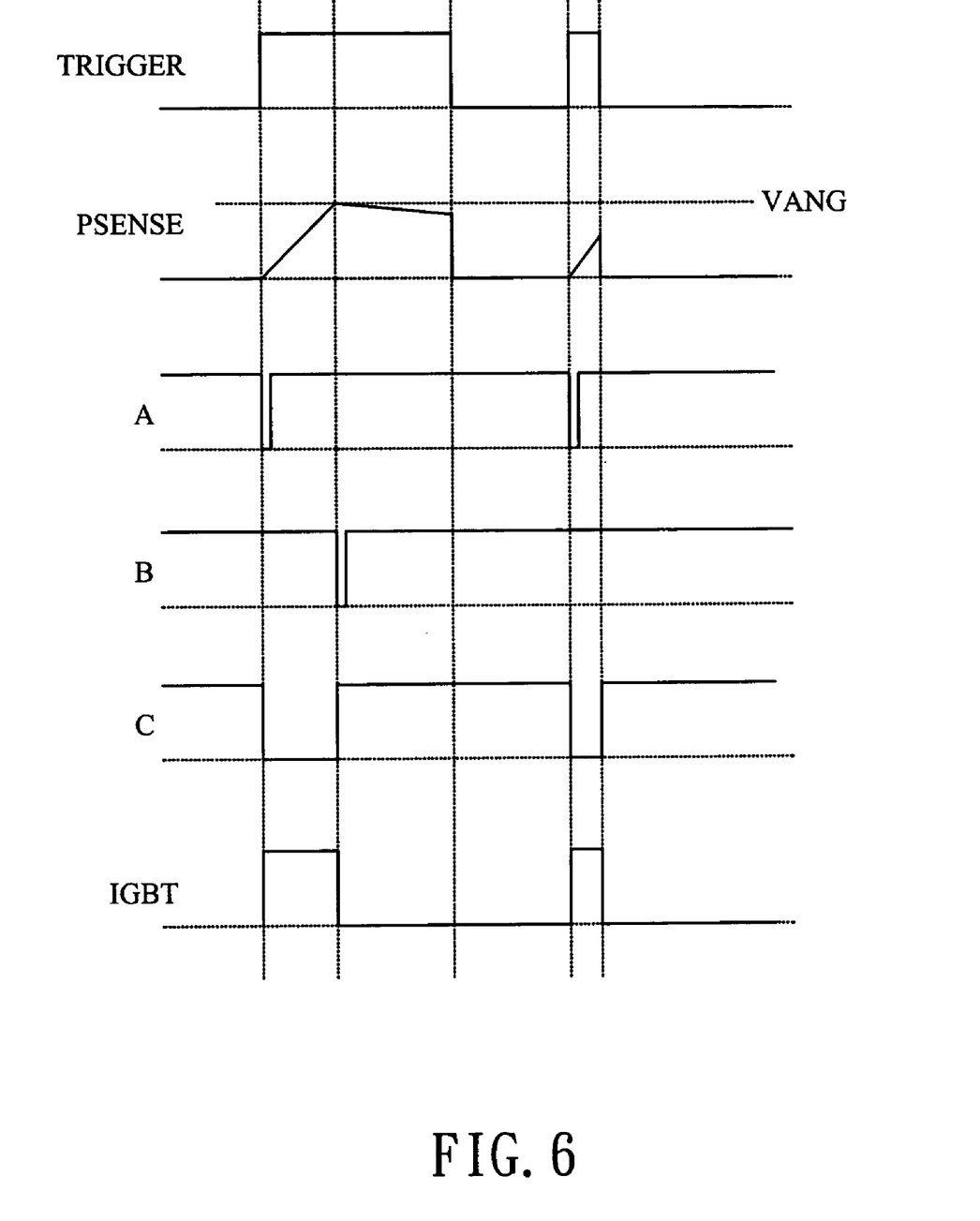
FIG. 6 illustrates a timing diagram of the second embodiment of the flash control circuit according to the invention.

A second embodiment of the trigger circuit 300 according to the invention will be described with reference to FIG. 5 in composition and FIG. 6 in timing.

The embodiment of the trigger circuit 300 comprises a first inverter 410, a first transistor 420, a comparator 440, a first logic gate 550 and a second logic gate 560. The first inverter 410 is used to receive and invert a trigger. The first transistor 420, an NMOS transistor, has a gate terminal connected to the output of the first inverter 410, a drain terminal connected to the negative input of the comparator 440 and a source terminal connected to the ground to form a discharge path when the trigger signal stops. The comparator is used to receive and compare the first comparison signal, the trigger signal and the output luminance voltage with a predetermined voltage to output a first comparison signal. The first logic gate 450 receives the first comparison signal, the trigger signal and the output of the second logic gate 460 to output a flash trigger signal. The second logic gate 460 receives the inverted trigger signal and the flash trigger signal and outputs a signal to the first logic gate 450. The second inverter 470 is coupled to the output of the first logic gate 450 to invert the flash trigger signal. In addition, the embodiment further comprises a single shot circuit connected to the output of the first inverter 410.

According to the invention, the trigger circuit 300 further comprises a clamping circuit 480 comprising a second transistor 481 and a resistor 482, in which the second transistor 481 is an NMOS transistor and is used to clamp the luminance sense voltage at a lower level than the predetermined voltage according to a full flash signal.

The operation of the second embodiment is described in detail as follows.

When the trigger signal is at a high level, the inverted signal does not turn on the first transistor. At that time, the charge voltage of the capacitor 220 is sensed by the third terminal PSENSE and outputted to the negative input of the comparator. The first logic gate 450 is a NAND gate having three inputs and is coupled to the output of the comparator 440, the first terminal TRIGGEER of the trigger circuit 300 to receive a trigger signal, and the output of the second logic gate 460. The second logic gate 460 is a NAND gate having two inputs with one input coupled to the single shot circuit 430 and the other input coupled to the output of the comparator 440. With such a circuit structure, when the capacitor 220 is not charged to the predetermined voltage, the comparator 440 and the first and second logic gates 450 and 460 jointly make the signal low-level. Next the outputted low-level signal is turned to a high-level signal after passing through the second inverter 470, turning on the IGBT and thus emitting a flash.

In the charging period, the terminal C has a low-level signal outputted after the operation of the first and second logic gates 450 and 460. Once the predetermined voltage is reached, the voltage at the terminal C becomes high. At that time, the IGBT has an opposite level with the signal at terminal C.

When the capacitor is charged to the predetermined voltage, the first and second logic gates 450 and 460 jointly latch the output of the first logic gate 450. Since terminal A is the output of the single shot circuit, terminal A first has a low-level signal during the charging period of the capacitor 220. At that time, since the second logic gate has a high-level signal, terminal C has a low-level signal through the operation of the first logic gate 450. Next, when terminal A becomes high again, the second logic gate 460 continues outputting a high-level signal and thus terminal C remains at a low-level state. When the charging voltage of the capacitor 220 reaches the predetermined voltage, the signal at terminal B is first high and the signal at terminal C is low after the operation of the logic gate 450 and the output of the second logic gate 460 is low. At that time, regardless of whether the signal at terminal B remains low or becomes high due to leakage of the capacitor, terminal C has a high-level signal and terminal C may be latched. When the trigger signal is high but lasts for too short a time, the capacitor is not charged to the predetermined voltage and the succeeding operation is like that described in the first embodiment.

When forcing flash generation, the clamping circuit 480 comprising the second transistor 481 and the resistor 482 clamps the voltage sensed by the third terminal PSENSE at a lower level than the predetermined voltage. After the operation of the comparator, the capacitor is determined to be below the predetermining voltage and the flash is emitted.

According to the principles and the objects of the invention, the invention has the advantage of reduced control pins because the flash control circuit only requires a flash trigger signal and a reference signal.

According to the principles and the objects of the invention, the invention has the advantage of not needing an additional discharge signal. When the trigger signal falls to a low level, the capacitor rapidly discharges to zero and does not need an additional discharge signal.

According to the principles and the objects of the invention, the invention has the advantage of a lower reference voltage. In the prior art, the discharging circuit is composed of bi-polar junction transistors. In this case, the luminance sense voltage is not increased from zero since the saturated VCE is at least 0.3V. However, in the invention an NMOS transistor is instead adopted, the luminance voltage is increased from approximately zero since the conduction resistance (Rdson) in an on state is lower. In this case, a reference voltage of greater than 50 mV may be enough.

According to the principles and the objects of the invention, the invention has the advantage of greater operating range of the reference voltage. In the prior art, the reference voltage has to be less than 5V−0.7V=4.3V to latch the output, and thus has a Vref operating range of about 0.3V~4.3V (Vcc−0.7), which creates problems when the Vcc is 3.3V or 2.5V. In the invention, Vref is operable between 50 mV~5V (Vcc).

According to the principles and the objects of the invention, the invention has the advantage of not needing an additional circuit since the reference may be adjusted directly by a D/A converter (DAC).

According to the principles and the objects of the invention, the invention is able to support a full flash function by a control signal.

According to the principles and objects of the invention, the invention has the advantages of higher precision and lower transmission delay. In the invention, fast comparators and logic gates are utilized; the transmission delay defined by the time when the luminance sense voltage is greater than the reference voltage and the time when the driving signal becomes low may be kept at less than 80 ns.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flashlight control circuit controlling a luminance of a flashlight according to a luminance sense voltage and a predetermined voltage wherein the luminance voltage is generated by charging a capacitor through a sense current generated by a phototransistor, comprising:
    a first comparator receiving and comparing the luminance sense voltage and the predetermined voltage to output a first comparison signal accordingly;
    a second comparator receiving and comparing a trigger signal and a reference voltage to output a second comparison signal accordingly;
    a logic gate having two inputs coupled to the output of the first comparator and the output of the second comparator respectively to compare the first comparison signal and the second comparison signal and output a flash trigger signal when the first and second comparison signals are at low voltage level; and
    a first transistor receiving the trigger signal to enable the second comparator to output the second comparison signal at low voltage level.

2. The flashlight control circuit as recited in claim 1 further comprising a second transistor having a gate terminal coupled to a positive input of the second comparator, a source terminal coupled to ground and a drain terminal receiving the luminance sense voltage to form a discharging path when the trigger signal stops.

3. The flashlight control circuit as recited in claim 1 further comprising a diode coupled between the output and the positive input of the first comparator to latch the output of the logic gate.

4. The flashlight control circuit as recited in claim 1, wherein the logic gate is an NOR gate.

5. The flashlight control circuit as recited in claim 1 further comprising a driver coupled to the output of the logic gate.

6. The flashlight control circuit as recited in claim 1, further comprising a clamping circuit clamping the luminance voltage to be lower than the predetermined voltage according to a full flash signal, said clamping circuit comprising:
    a third transistor having a drain terminal receiving the luminance sense voltage and a source terminal receiving the full flash signal.

7. A flashlight control circuit controlling a luminance of a flashlight according to a luminance sense voltage and a predetermined voltage wherein the luminance voltage is generated by charging a capacitor through a sense current generated by a phototransistor, comprising:
    a first inverter receiving and inverting a trigger signal;

a first transistor having a gate terminal coupled to an output of the first inverter, a drain terminal coupled to a negative input of the comparator and a source terminal coupled to ground forming a discharging path when the trigger signal is low;

a comparator receiving and comparing the luminance voltage and the predetermined voltage to output a comparison signal;

a first logic gate and a second logic gate wherein an input of the first logic gate is coupled to the comparator and an output of the second logic gate to receive the comparison signal, the trigger signal and the output of the second logic gate and outputs a flash trigger signal, and the second logic gate receives the inverted trigger signal and the flash trigger signal and outputs a signal to the logic gate; and a second inverter coupled to an output of the first logic gate to invert the flash trigger signal.

8. The flashlight control circuit as recited in claim 7, wherein each of the first logic gate and the second logic gate is a NAND gate.

9. The flashlight control circuit as recited in claim 7, further comprising a single shot circuit coupled to the output of the first inverter.

10. The flashlight control circuit as recited in claim 7, further comprising a clamping circuit clamping the luminance sense voltage to be lower than the predetermined voltage according to a full flash signal, said clamping circuit comprising:

a second transistor having a drain terminal coupled to the luminance sense voltage and a source terminal receiving the full flash signal.

* * * * *

UNITED STATES PATENT AND TRADEMARK OFFICE
CERTIFICATE OF CORRECTION

| | | |
|---|---|---|
| PATENT NO. | : 7,106,008 B2 | Page 1 of 1 |
| APPLICATION NO. | : 10/930996 | |
| DATED | : September 12, 2006 | |
| INVENTOR(S) | : Yi-Shan Chu | |

It is certified that error appears in the above-identified patent and that said Letters Patent is hereby corrected as shown below:

Title page, item [73]
    The Assignee name reads "Leadtread Technology Corp." should read --Leadtrend Technology Corp.--.

Signed and Sealed this

Tenth Day of July, 2007

JON W. DUDAS
*Director of the United States Patent and Trademark Office*